Patented Feb. 26, 1929.

1,703,134

UNITED STATES PATENT OFFICE.

LAWRENCE BRADSHAW AND HENRY V. DUNHAM, OF BAINBRIDGE, NEW YORK.

ADHESIVE MATERIAL AND PROCESS OF MAKING.

No Drawing.　　Application filed December 17, 1926.　Serial No. 155,547.

This invention has for its object the production of a glue or adhesive especially adapted for the gluing of wood, wood veneer and the like, from mixtures of starch with vegetable protein substances and casein, and is more particularly directed to modifications and improvements in our copending application Ser. No. 144,400, filed Oct. 26, 1926. In the aforesaid application we have disclosed certain methods for producing a glue suitable for the gluing of wood, which comprise incorporating a vegetable protein material (viz, the highly proteinaceous seedmeals of commerce) with starch, and dissolving such mixture by the aid of an alkali, the composite glue being largely free from the undesirable viscid and slippery character of ordinary starch glues, and possessing superior working qualities.

We have now found that further important advantages are secured by the use of a mixture of casein and seedmeals in place of the seedmeals described in the above cited application. The addition of casein imparts to the composite glues better water-resisting qualities, more rapid setting and greater adhesive strength.

An important object of the present invention is to provide a composite glue in which these improvements can be realized in a simple formula such as in Examples 2 and 3 below.

The starch glue and the protein glue may be prepared either separately (with the addition of water) and then mixed together, or the starch and the protein materials—i. e. seedmeals—and casein may be incorporated dry with other ingredients (as hereinafter set forth) and the resulting mixture subsequently admixed with water.

If desired, the seedmeal glue and the casein glue, prepared according to suitable formulas (for example, as described below), may be separately mixed with water, thereafter mixed together and added to the prepared starch glue (prepared, for example, as described below); or the fluid casein glue may be added to the composite starch seedmeal glue prepared at described in Example 1 of the copending application cited, but these methods are obviously tedious.

As examples of methods and mixtures which have given satisfactory results, the following may be given. The parts are by weight.

Example 1.

(A) Starch glue prepared by a well-known commercial method: 225 pounds of water are placed in a steam-jacketed kettle provided with an efficient stirrer. 100 pounds of a good grade of cassava starch is stirred in. A solution of 3 pounds of caustic soda in 10 pounds of water is then added and the whole is heated with constant stirring to about 165° F. This operation may take about 30 minutes. The glue is then cooled (preferably rapidly) with continued stirring, to room temperature (say 70 to 80° F.). This glue is viscid and has a sluggish flow.

(B) Casein-peanut-meal glue prepared from a dry mixture of casein 22 parts, pulverized peanut meal 33 parts, hydrated lime 30 parts, sodium carbonate 9 parts, sodium fluoride 5 parts. Method: 200 pounds of this dry mixture is added to 450 pounds of water at about 60° to 80° F., in a suitable mixing kettle and stirred for about 20 minutes. It is then diluted with about 50 pounds of water to produce a thin flowing glue.

The prepared glues (A) and (B) (in the quantities here stated, if desired) are then mixed together and well stirred for about 5 minutes. The ultimate product is a smooth, cohesive glue capable of being readily spread by glue-spreading machinery.

This example is given by way of illustration. It will be understood that we do not restrict ourselves to the precise formulas or mixing methods given for the starch glue (A) and the protein glue (B) nor to the particular proportion of the glue (A) to the glue (B), as given.

Although the foregoing example has given satisfactory results, we prefer for most purposes to mix the various dry ingredients into a single glue-base as in Examples 2 and 3 following. This dry base can be conveniently stored, and shipped to the point where it is to be used, where it is then mixed with water as required.

Example 2.

Cassava starch 42 parts, peanut meal 15 parts, casein 14 parts, hydrated lime 15 parts, sodium carbonate 9 parts, sodium fluoride 5 parts. These substances are thoroughly blended together in the dry state, thereby forming a dry glue base. 100 parts of this dry glue base is thereafter added to about 225 parts of water in a steam-jacketed mixing kettle with good agitation and heated to about 150 to 160° F., after which the fluid glue is ready for use. Before applying, it is preferably allowed to cool off to about 70 to 80° F., the stirring being continued. If desired, the glue may be diluted with additional water.

As an alternative method (which we prefer) the water may be preheated in the kettle to about 160° F. and the dry glue base added to the hot water with agitation as above; in this case the temperature is preferably maintained at 140 to 160° F., for about 15 minutes and the glue is then allowed to cool.

In either method, the rate of cooling is preferably accelerated by passing cold water through the jacket. The resulting glue is of suitable consistency, cohesiveness and tenacity, and flows and spreads readily. It should be used up within a period of about 24 hours after mixing the base with water.

*Example 3.*

Cassava starch 33 parts, peanut meal 22 parts, casein 11 parts, hydrated lime 20 parts, sodium carbonate 8 parts, sodium fluoride 4 parts, sodium sulphite 2 parts. This mixture constitutes the dry glue base. Proceed as in Example 2. The properties of the fluid glue made from this base are similar to those of Example 2.

It will be evident that various modifications of these methods can be used without departing from the scope of the invention. Likewise we do not desire to be limited to the particular compounds and proportions given here by way of illustration. In place of cassava, we may use other starches such as potato starch, and we may substitute for peanut meal other seedmeal containing a large percentage of protein, such as those of cottonseed, linseed, hempseed, soybean, castor oil seed and the like, or mixtures thereof. We believe that the small amounts of starch which are naturally present in some of these seeds take part in the reaction under the conditions described in the above examples.

The peanut meal (or other seedmeal) employed is preferably that from which, after removing a substantial portion at least of the husk, a major portion of the oil has been removed by pressing or extraction, such as the ground press-cake of commerce. The commercial meal may require further grinding. We prefer to use a meal of such fineness that substantially all of it will pass through an 80 to 100 mesh screen.

In the appended claims, the term "meal" and the term "presscake" are intended to include the meals and presscakes whether the oil is partially or completely removed therefrom, or whether the hull or seed coating is partially or wholly removed therefrom; and the terms "peanut meal" and "peanut presscake" are intended to include equivalent meals and press-cakes. These terms are not intended to cover the separated protein or the separated oil, by themselves, from the seeds referred to.

The term "alkaline earth hydroxide" as used in the claims is intended to include the corresponding oxide, and also the oxide and hydroxide of magnesium. The term "salt" is used to include both the singular and plural forms, i. e. one salt or several salts. The term "alkaline salt of an alkaline metal" as used here, refers to the water-soluble salts of the alkali metals which salts react alkaline to litmus; and "alkali" includes the alkaline compounds of the alkali metals and of the alkaline earth metals, e. g. sodium carbonate, trisodium phosphate, sodium sulphite, caustic alkalies, e. g. KOH and NaOH, as well as calcium, barium, strontium and magnesium oxides and hydroxides. The term "caustic alkali" is more specific and refers to the hydroxides of sodium and potassium.

The mixing of the glue base with the water is accompanied by (previous, simultaneous or subsequent) heating to a temperature at which the starch granules burst in the presence of the admixed compounds.

Under the term "adhesive material" we include both the glue base and the liquid adhesive.

Under the term "starch material" we include both pure starch and crude starch, i. e. materials consisting essentially of starch.

In the above examples we have used lime as an ingredient of the composition, the function of which is partly to interact with the alkali metal salts present to liberate caustic soda, and partly to aid the setting and increase the water-resistant properties of the adhesive. It will be understood that in some cases, especially when free caustic alkali is added, the lime may be omitted, although the water-resistant quality of the glued joint is thereby diminished.

A mixture is made up of 60 parts of starch, 25 parts of peanut meal, 10 parts of casein, and 5 parts of sodium fluoride, all dry. This base is added to 220 parts of water previously heated to about 160° F. in a steam-jacketed kettle provided with a stirrer, and mixed for one or two minutes. A solution of 3 parts of caustic soda in 10 parts of water is then added and the stirring continued for about 15 minutes, during which the temperature is preferably maintained at about 140° F. after which the glue is allowed to cool to 100° F. or below, preferably with continued stirring.

If desired, the cooling may be hastened by passing cold water through the jacket. The fluid adhesive is suitable for the gluing-up of wood veneers.

Also in place of lime, other alkaline earth oxides, or hydroxides such as those of barium and strontium may be employed, as well as magnesium oxide or hydroxide. Slaked lime is generally preferable, as being cheaper and efficient.

It will be understood that in most cases it is advisable to ship the dry glue base to the consumer, who will add water as described above and then use the adhesive thereby produced. The liquid mixture cannot be kept for long periods of time without undergoing considerable decomposition.

The term "dry" as used herein, is not intended to indicate that the materials are absolutely free from every trace of moisture, but rather to indicate that water has not been added thereto to produce a distinctly wet or liquid mass. The materials can all be employed in their ordinary condition of dryness as found in commerce.

We claim:

1. A new adhesive material comprising starch, casein and a seed-meal rich in protein, together with an alkali in amount sufficient to form a liquefying agent for the starch and proteids, when water is added.

2. A new adhesive material comprising starch, casein and a seedmeal rich in protein, together with an alkaline compound of an alkali metal and an alkaline earth metal hydroxide together in amount sufficient to form a liquefying agent for the starch and proteids, when water is added.

3. A new adhesive material comprising starch, casein and a seedmeal rich in protein, together with an alkaline earth metal hydroxide and a soluble alkali metal salt capable of reacting with the latter when water is added, the alkaline materials being in amount sufficient to form a liquefying agent for the starch and proteids, when water is added.

4. A new adhesive material comprising starch, casein and peanut presscake together with an alkali in amount sufficient to form a liquefying agent for the starch and proteids, when water is added.

5. A new adhesive material comprising starch, casein and peanut presscake together with an alkaline earth metal hydroxide and an alkali metal alkaline compound the two latter being in aggregate amount sufficient to form a liquefying agent for the starch and proteids, when water is added.

6. A process for making an adhesive composition by incorporating finely pulverized seedmeal rich in protein, casein and starch with an alkaline earth metal hydroxide and an alkali metal alkaline compound, and mixing with water, sufficient heat being applied in conjunction with this latter step, to burst the starch granules.

7. A glue base which comprises starch, casein and a vegetable seedmeal rich in protein, together with an inorganic alkaline substance capable of producing a solvent for the proteins and the starch, when water is added.

8. A glue base which comprises starch, casein and a comminuted presscake from seed of relatively high protein content, together with an alkali capable of producing a solvent for the proteins and the starch, when water is added.

9. A process for modifying the viscid and slippery character of starch wood-working glues, which consists in incorporating with the starch, substantial amounts of a seed meal rich in protein and of casein and mixing with sufficient fixed-alkali and water to obtain a fluid consistency.

In testimony whereof we affix our signatures.

LAWRENCE BRADSHAW.
HENRY V. DUNHAM.